United States Patent [19]
Yoon et al.

[11] Patent Number: 4,871,518
[45] Date of Patent: Oct. 3, 1989

[54] RECOVERY OR REMOVAL OF URANIUM BY THE UTILIZATION OF ACORNS

[75] Inventors: Myongwhan Yoon, Seoul; Seongtae Whang, Chungcheongnam; Insoon Chang, Chungcheongnam; Pilsoon Han, Chungcheongnam, all of Rep. of Korea

[73] Assignee: Korea Advanced Energy Reasearch Institute, Chungcheongnam, Rep. of Korea

[21] Appl. No.: 135,409

[22] Filed: Dec. 21, 1987

[30] Foreign Application Priority Data

Sep. 30, 1987 [KR] Rep. of Korea .................... 87-10910

[51] Int. Cl.$^4$ .......................... C01G 43/00; G21F 9/10
[52] U.S. Cl. .......................................... 423/11; 423/6; 423/12; 423/1; 423/92; 423/101; 423/659; 252/631; 252/626; 534/11
[58] Field of Search ............... 423/6, 11, 12; 252/628, 252/631

[56] References Cited

U.S. PATENT DOCUMENTS

| | | | |
|---|---|---|---|
| 3,725,291 | 4/1973 | Serbus et al. | 423/6 X |
| 4,180,545 | 12/1979 | McCullough et al. | 423/11 X |
| 4,234,555 | 11/1989 | Pulley et al. | 423/11 X |
| 4,269,706 | 5/1981 | Sondermann | 423/12 X |
| 4,393,028 | 7/1983 | Crossley et al. | 423/15 |
| 4,407,781 | 10/1983 | Crossley et al. | 423/15 |

FOREIGN PATENT DOCUMENTS 86-019957 5/1960 Japan .
52-029480 3/1977 Japan .
56-125699 10/1981 Japan .

OTHER PUBLICATIONS

Lindsten, Don C. et al, "Decontamination of Water Containing Radiological Warfare Agents", *Report No. USAMERDC-2136* (Mar. 1975).
J. M. Napier et al., "Recycle and Biodestruction of Hazardous Nitrate Wastes", *Report No. Y/DZ-234* (Jan. 12, 1987).
J. C. Mailen et al., "Separation of Uranium and Dibutyl Phosphate Contained in 30 vol. % Tributyl Phosphate Solvents", *Report No. ORNL/TM149837* (Jul. 1986).
D. R. Shewrwood et al., "Evaluation of Selected Neutralizing Agents for the Treatment of Uranium Tailings Leachates: Laboratory Progress Report", *Report No. PNL-4524* (Feb. 1983).
W. R. Herald et al., "Evaluation of Organic and Inorganic Adsorbents for the Removal of Uranium and Plutonium from process Streams", *Corp Source Codes:* 4347000 (sponsor: Energy Research and Development Administration) (1977).

*Primary Examiner*—Brooks H. Hunt
*Assistant Examiner*—Virginia B. Caress
*Attorney, Agent, or Firm*—Armstrong, Nikaido, Marmelstein, Kubovcik & Murray

[57] ABSTRACT

This invention can treat a uranium-containing solution of high or low concentration and/or the waste generated from uranium conversion processes, etc. It is characterized by the use of acorns, nuts of oak tree, which can be easily obtained in our botanical system. By coprecipitating the uranium or other heavy metal elements with the extract of acorns, this invention can not only recover the uranium of other heavy metal elements but also can reduce them before being discharged to the environmental radioactivity level.

6 Claims, No Drawings

RECOVERY OR REMOVAL OF URANIUM BY THE UTILIZATION OF ACORNS

BACKGROUND OF THE INVENTION

This invention relates to the recovery or removal of uranium by the utilization of Dotory (acorn).

Various chemical forms of uranium compound exist in the waste generated from uranium processing; such as, AUC [$(NH_4)_4 UO_2 (CO_3)_3$], ADU [$(NH_4)_2 U_2O_7$], uranyl nitrate [$UO_2 (NO_3)_2$], etc.

A safe waste treatment should be achieved for the conservation of our ecological system and for national health and environment preservation.

In many countries including Korea, the waste generated from a $UO_2$ powder manufacturing process has been treated through a storage treatment method in a lagoon (or pond). However, this method is not sufficient to solve the serious problem of α-waste treatment. Besides, it is an international tendency to assume more and more severe restrictions and thus each country has been carrying out a research for a new technology.

In case of the U.S.A., an ion exchange method, reverse osmosis method, neutralization and precipitation method, etc. have been developed under the direction of the Department of Energy (DOE).

The Oakridge Y-12 plant had treated the waste in an unlined percolation pond, as in Korea, but starting from 1976 they carried out a research for a substitute process to treat the waste under storage in the pond by use of neutralization, precipitation, anaerobic denitration, coagulation and filtration methods, etc.

Oak-Ridge Nuclear Laboratory (ORNL) performed research to develop many kinds of solid sorbents for the treatment of uranium and DBP in TBP (30%) solvent, but no satisfactory result was obtained.

Under the direction of NRC (Nuclear Regulation Committee) in U.S.A., Sherwood D.R. et al of PNI (Pacific National Institute) reported in 1983 that Ca-$(OH)_2$ or lime is most effective to treat the waste of a uranium-containing solution based on the estimation standard for uranium treatment; that is, (1) the quality of water after treatment, (2) sludge handling efficiency and hydraulic quality, and (3) neutralizer cost and acid neutralization efficiency.

Pulley H. et al of DOE have a patent for a coagulation method using calcium fluoride for the removal of uranium from aqueous HF solution.

Herald W. R. et al of Mound Laboratory reported in an analysis of organic and inorganic adsorbents using porous ion exchange resin for the removal of uranium and plutonium for ERDA in 1977 that the hydroxypatite is most effetive one, but the adsorptive resins of physical adsorption are not good for uranium treatment.

In 1983 Crossley, T. J. et al of Westinghouse Electric Corporation got a patent on a uranium treatment method from molybdenum solution, in which HCl acid is used to remove $CO_2$ gas followed by an addition of $NH_4OH$ to make the solution alkaline and then uranium is precipitated and filtered.

Crossley, T. J. of Wyoming Mineral Corp has a patent for a uranium treatment method from slurries containing molybdenum, where uranium precipitates in the form of calcium carbonate and calcium uranate by adding alkali metal hydroxide.

In Japan, Mitsubishi Co. obtained a patent in 1981 for a treatment method of uranium oxide (fine particle) which is adsorbed from the waste by iron salt.

Kanebo K.K. et al have a patent of a treatment method using an adsorbent made of titanium compound incorporated into porous media for the recovery of uranium from sea water and General Electric Co., of U.S.A. has a patent for a treatment method of uranium containing waste in U.S.A. (1982) and in Japan (1983).

Mitsubishi Metal Co. holds a patent for a uranium treatment from waste in 1982 and Yoshiwara Tsuneichi et al in Metal Industries got a patent for a uranium removal technology from aqueous ammonium carbonate solution (1978).

Mouton et al of Campanie Generale des Matieres Nuclaires S.A. of France have a patent for a uranium and titanium treatment method from uraniferous and bicarbonate solution by the addition of aluminium salt (1984).

Muzzarelli R. A. of Ancona University in Italy performed research on uranium treatment from sea water or waste by use of derivatives of chitosan and ascorbic acid in 1985 and Fresenius W. et al of Taunusstein of west Germany carried out research to treat a small amount of uranium from water and waste in 1984.

Wu, Quing Chang et al of China investigated uranium treatment with ion exchange resin in 1984 and Galun M. et al of Tel Aviv University in Israel researched uranium treatment from solution by fungal biomass in 1984. Weir, Donald, and Robert et al of Sherritt Gordon Mines Ltd. In South Africa patented a uranium treatment technology from a sulfate solution containing molybdenum in 1983.

Also, Czechoslovakia and Fumania obtained patents on the uranium treatment in 1980 and 1982, respectively, and Skrylev L. D. et al of U.S.S.R. did their own research on the uranium treatment from a dilute solution by flotation in 1980.

In Korea, Chang, In Soon et al of the Korea Advanced Energy Research Institute (KAERI) have a patent on the uranium treatment method by controlling temperature and pH in 1984.

Likewise, a more safe treatment method is required since the amount of radioactive waste is ever-growing due to the increase of $UO_2$ production and moreover this treatment of uranium containing waste from nuclear power plants and the uranium recovery are to be carried out in national aspects.

SUMMARY OF THE INVENTION

This invention treats the waste and uranium-containing solution more safely, more easily, and more economically than any other method and also can minimize the α-activity of discharged material to the environment, hence it is useful for the field of radioactive waste treatment and of uranium recovery.

Different from any other conventional method, this invention uses acorns which can be obtained easily in our botanical system. It can treat a uranium-containing waste of high or low concentration by coprecipitating the uranium in it and also can reduce the radioactivity to an almost non-detectable level.

Acorn is a nut of oak (*Quercus Dentata*) which is widely distributed throughtout Korea, Japan, China, and Manchuria. Following is the list of trees belong to the Eagaceae group whose nuts can be utilized for this invention;

1. Quercus Dentata

2. Quercus Acutissima
3. Quercus Variabilis
4. Quercus Myrsinaefolia
5. Quercus Mongolica
6. Quercus Crispula
7. Quercus Glandulifera, Blume
8. Quercus Acuta
9. Quercus Glauca
10. The other trees which belong to the Eagaceae group.

DETAILED DESCRIPTION

The detailed description of the uranium recovery process of this invention is as follows;
1. Dried acorns are extracted by water until the extract becomes colorless.
2. The extract of 0.2–20% is added to uranium-containing solution or waste and well mixed.
3. A small amount of $CaCl_2$ (0.5–5 g/l) is added if the solution or waste has no calcium ion in it.
4. While stirring in a mixing tank, the solution of step (3) is made alkaline (pH 8–11) by use of caustic soda or ammonium hydroxide.
5. The solution is sedimented by force or naturally in a precipitating or separating tank.
6. Mother liquor of the solution is removed from the precipitating tank.
7. The precipitate is then filtered and dried or stored in a storage tank for further uranium recovery.

The acorn extract forms a new chemical compound when added with the calcium ion. This compound, in the solution containing uranium or any heavy metal element, separates the uranium or any heavy metal element present from the rest by coprecipitation.

The acorn extract is different from the well-known Tannin (Tannic acid), although it has somewhat similar functional groups of Tannin, for which the author of this invention named it "Acornic acid".

This acornic acid is a natural organic cyclic compound of a large molecular weight and its property to coprecipitate with uranium or other heavy metal elements when added with the calcium ion is thought to be related with "host-guest chemistry".

To investigate the treatment efficiency, the following experiments were carried out with a real waste sample;

The waste (92.5 μg/ml) was sampled from the storage lagoon of the uranium conversion facility of the KAERI.

The experiment was repeated for a wide range of uranium concentration which was controlled by adding high concentration UN (454.1 mg/ml) solution from the KAERI's purification facility.

The analysis technique generally varies with the type and the uranium concentration of the sample; most well-known separation methods are such as Chelate resin method, TBP extraction method, and Oxin-extraction method and TBP Oxin-extraction method, etc and measurement methods are such as Arsenaxo-III absorption photometry, fluorophotometry, α-ray counting method, etc.

For a more accurate measurement, the analyses were carried out at the KAERI's Chemical Analysis Laboratory and the Environmental Safety Laboratory which are already well-known for their high technologies and experiences. At the Environmental Safety Laboratory, a low background α-β counter (gas flow type) was used as an α-ray counter and at the Chemical Analysis Laboratory, a Topo extraction and Arsenazo-III spectrophotometry method was used.

The results are summarized in Table 1.

TABLE 1

Final Uranium Contents of the Various Types of Solutions after Treatment by this Invention Method

| SOLUTION TYPE | URANIUM CONCENTRATION | RESIDUAL URANIUM CONCENTRATION AFTER TREATMENT | |
|---|---|---|---|
| | | LOW BACKGROUND α-β COUNTER (GAS FLOWTYPE) | TOPO EXTRACTION AND ARSENAZO-III SPECTROPHOTOMETRY |
| RAIN WATER | | N.D. | <2 μg/ml |
| TANK-17 WASTE | 92.5 μg/ml | N.D. | <2 μg/ml |
| TW-3 | 4,900 μg/ml | N.D. | <2 μg/ml |
| TW-5 | 1,926 μg/ml | 1–1.5 μg/ml | 2–2.3 μg/ml |
| TA-16-10 | 92.5 μg/ml | N.D. | <2 μg/ml |
| TA-16-40 | 92.5 μg/ml | N.D. | <2 μg/ml |
| TA-16-80 | 92.5 μg/ml | N.D. | <2 μg/ml |
| TA-12-40 | 92.5 μg/ml | N.D. | <2 μg/ml |
| TA-12-80 | 92.5 μg/ml | N.D. | <2 μg/ml |

N.D.: NON-DETECTABLE

As shown in Table 1, this invention method can treat a high-concentration as well as a low-concentration uranium solution, and also is a very unique and economically efficient method for the uranium recovery and treatment of the waste which contains radioactive materials or heavy metal elements.

What is claimed is:
1. A method of treating a solution containing uranium, and not containing calcium ions, comprising the steps of:
   (a) extracting dry acorns with water until the extract becomes colorless;
   (b) mixing 0.2 to 20% by volume of the extract with the solution containing uranium;
   (c) adding 0.05 to 5 g per liter of $CaCl_2$ to the solution obtained in step (b);
   (d) stirring the solution obtained in step (c) and adjusting the pH of the solution to 8 to 11 to precipitate a uranium-containing compound;
   (e) separating the precipitate from the solution in step (d) to obtain a sludge and a mother liquor; and
   (f) filtering and drying the sludge.
2. The method according to claim 1, wherein the acorns are obtained from trees belonging to the Eagaceae group including:
   Quercus Dentate,

Quercus Acutissima,
Quercus Variabilis,
Quercus Myrsinaefolia,
Quercus Mongolica,
Quercus Crispula,
Quercus Glandulifera, Blume,
Quercus Acuta, and
Quercus Glauca.

3. The method according to claim 1, wherein caustic soda or ammonium hydroxide is used in step (d) to adjust to pH.

4. A method of treating a solution containing uranium comprising the steps of:
(a) extracting dry acorns with water until the extract becomes colorless;
(b) mixing 0.2 to 20% by volume of the extract with the solution containing uranium;
(c) stirring the solution obtained in step (b) and adjusting the pH of the solution to 8 to 11 to precipitate a uranium-containing compound;
(d) separating the precipitate from the solution in step (c) to obtain a sludge and a mother liquor; and
(e) filtering and drying the sludge.

5. The method according to claim 4, wherein the acorns are obtained from trees belonging to the Eagaceae group including:
Quercus Dentate,
Quercus Acutissima,
Quercus Variabilis,
Quercus Myrsinaefolia,
Quercus Mongolica,
Quercus Crispula,
Quercus Glanulifera, Blume,
Quercus Acuta, and
Quercus Glauca.

6. The method according to claim 4, wherein caustic soda or ammonium hydroxide is used in step (c) to adjust the pH.